United States Patent [19]
Beal et al.

[11] 3,725,392
[45] Apr. 3, 1973

[54] 20,21-ACETONIDES OF PREGNENES, 16β-ALKYL-17α,20,21-TRIHYDROXY PREGNENES, AND PROCESS FOR THE PRODUCTION THEREOF

[75] Inventors: Philip F. Beal, Kalamazoo; Kenneth P. Shephard, Portage, both of Mich.

[73] Assignee: The Upjohn Company, Kalamazoo, Mich.

[22] Filed: Apr. 23, 1971

[21] Appl. No.: 137,051

[52] U.S. Cl..................260/239.55 D, 260/239.5, 260/239.55 R, 260/397.45

[51] Int. Cl............................................C07c 173/00

[58] Field of Search...........260/239.55 D, 397.45, Machine Searched Steroids

[56] References Cited

UNITED STATES PATENTS 3,182,056   5/1965   Tanabe...........................260/239.55

*Primary Examiner*—Elbert L. Roberts
*Attorney*—John Kekich and Ward F. Nixon

[57] ABSTRACT

This invention relates to novel 20,21-acetonides of pregnenes and novel 16β-alkyl-17α,20,21-trihydroxy pregnenes, and processes for the production thereof. The compounds of this invention are useful intermediates; they provide an improved means for obtaining valuable 9α-fluoro-16β-alkylprednisolones and their 21-acylates which are known and highly active anti-inflammatory agents, for example, 9α-fluoro-16β-methylprednisolone (Betamethasone).

18 Claims, No Drawings

20,21-ACETONIDES OF PREGNENES, 16β-ALKYL-17α,20,21-TRIHYDROXY PREGNENES, AND PROCESS FOR THE PRODUCTION THEREOF

DETAILED DESCRIPTION OF THE INVENTION

The novel intermediates of this invention and processes for the production thereof are illustratively represented by the following sequence of formulas:

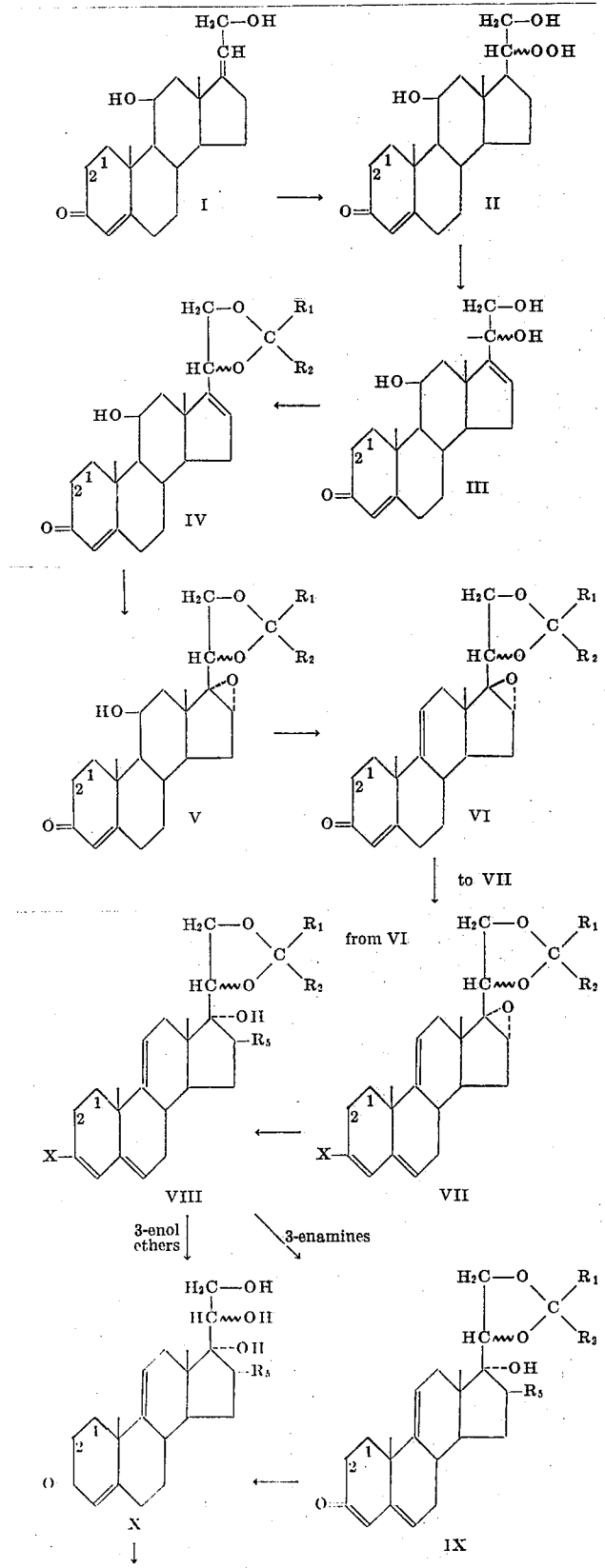

wherein R is acyl; $R_1$ and $R_2$ taken separately are each hydrogen, alkyl, aralkyl, or aryl; $R_1$ and $R_2$ taken together with the attached carbon represent cycloalkyl; X is alkoxy or the radical, $$-N\begin{matrix}R_3\\R_4\end{matrix}$$

in which $R_3$ and $R_4$ taken separately are each alkyl and $R_3$ and $R_4$ taken together with $$-N\begin{matrix}\\ \end{matrix}$$

constitute a saturated heterocyclic amino radical; and the 1,2-carbon atom linkage is a single bond linkage or a double bond linkage.

In this application the wavy line appearing at the 20-position represents the α (alpha) configuration, the β (beta) configuration or mixtures thereof.

The term "acyl" means the acyl radical of an organic carboxylic acid preferably a hydrocarbon carboxylic acid, of one to 18 carbon atoms, inclusive, such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic, myristic, palmitic, stearic acids, and the like.

The term "alkyl" means an alkyl radical of one to eight carbon atoms, inclusive, such as methyl, ethyl, propyl, butyl, amyl, hexyl, heptyl, octyl, and isomeric forms thereof.

The term "aralkyl" means an aralkyl radical of seven to 13 carbon atoms, inclusive, such as benzyl, phenethyl, phenylpropyl, benzhydryl, and the like.

The term "aryl" means an aryl radical of six to 12 carbon atoms, inclusive, such as phenyl, tolyl, xylyl, naphthyl, diphenyl, halophenyl, nitrophenyl, and the like.

The term "cycloalkyl" means a cycloalkyl radical of three to eight carbon atoms, inclusive, such as cyclopropyl, cyclobutyl, cyclopentyl, cyclohexyl, cycloheptyl, and cyclooctyl.

The term "alkoxy" means an alkoxy radical of one to 12 carbon atoms, inclusive, such as methoxy, ethoxy, propoxy, butoxy, pentoxy, hexyloxy, heptoxy, octoxy, nonoxy, decoxy, undecoxy, dodecoxy, and isomeric forms thereof.

The term "cyclic amino radical" means a saturated 5 to 9 ring atom cyclic amino radical and is inclusive of pyrrolidino, alkylpyrrolidino, 2,2-dimethylpyrrolidino, and the like, piperidino, alkylpiperidino such as 2-methylpiperidino, 3-methylpiperidino, 4,4-dimethylpiperidino and the like, 4-methylpiperazino and the like, morpholino, alkylmorpholino, such as 2-methylmorpholino, 3-methylmorpholino and the like, hexamethyleneimino, homomorpholino, homopiperidino, thiomorpholino, octamethyleneimino, and the like.

The novel intermediates of the invention are prepared by subjecting a compound of formula I to a photosensitized oxygenation with a source of oxygen, for example, using a photosensitizer such as hematoporphyrin and a source of ultraviolet light in accordance with the procedures disclosed by Schneider et al., U. S. Pat. No. 3,281,415 to obtain the corresponding 20-hydroperoxides of formula II. The compounds of formula II, thus obtained are then subjected to reduction with a tri-lower alkyl phosphite such as trimethylphosphite in accordance with the procedure disclosed by Gardner, U. S. Pat. No. 3,356,696, to obtain the corresponding $20\alpha$- and $20\beta$-hydroxy compounds of formula III. The compounds of formula III are prepared directly from the starting materials I by a "one pot" process or by reduction of the isolated hydroperoxy intermediates II.

The compounds of formula III are then converted to the corresponding 17,20-acetonides of formula IV by reacting the selected 20-hydroxy compound with the appropriate aldehyde or ketone having the formula

wherein $R_1$ and $R_2$ are as hereinbefore defined. The reaction is preferably conducted in the presence of an acid catalyst such as perchloric acid, p-toluenesulfonic acid, hydrochloric acid, and the like. Where the aldehyde or ketone is a liquid, it is convenient to employ an excess of same to serve as solvent for the reaction. Where the aldehyde or ketone is a solid, it is desirable to employ an inert organic solvent, such as tetrahydrofuran, dioxane, ether and the like, to facilitate the reaction. The compounds of formula IV, thus obtained, are then epoxidized by methods known in the art to obtain the corresponding $16\alpha,17\alpha$-oxido compounds of formula V, for example, the selected compound IV is dissolved in an appropriate solvent such as methylene chloride and treated with a peracid such as peracetic, perbenzoic or m-chloroperbenzoic acid to obtain the corresponding $16\alpha,17\alpha$-oxido compound, V. The compounds of formula V are then converted to the corresponding 9(11)-dehydro compounds VI in accordance with methods known in the art, illustratively, with sulfuric acid, with an N-haloamide or N-haloimide and anhydrous sulfur dioxide using the procedure disclosed in U. S. Pat. No. 3,005,834, or with anhydrous sulfur dioxide and an organic base followed by treatment with a halogen (e.g., chlorine, bromine, or iodine) or with a sulfuryl halide (e.g., sulfuryl chloride, bromide or iodide) as disclosed in U. S. Pat. No. 3,441,559.

The compounds of formula VI thus obtained, are then protected by the formation of a 3-enamine or a 3-enol ether. The enamines are prepared by reacting the selected $\Delta^4$ or $\Delta^{1,4}$-3-keto steroid VI with a secondary amine in accordance with methods known in the art, for example, U. S. Pat. Nos. 2,781,342 and 2,886,564; Heyl and Herr, J. Am. Chem. Soc. 75, pages 1913 and 5927 (1953) and U. S. Pat. application Ser. No. 801,859, filed Feb. 24, 1969. Representative secondary amines include, for example, dialkylamines such as diethylamine, dipropylamine, diisopropylamine, dibutylamine, dihexylamine, dioctylamine, and didodecylamine; cycloalkylamines such as dicyclohexylamine and the like; cyclic amines such as piperidine, pyrrolidine, tetrahydroquinoline, oxazolidine (tetrahydrooxazole), morpholine, homomorpholine, C-alkyl-substituted pyrrolidine, e.g., 2,4-dimethylpyrrolidine, 3-isopropylpyrrolidine, and 3,3-dimethyl-pyrrolidine, and the like; aralkylalkylamines such as N-methylbenzylamine, N-ethylbenzylamine and the like; substituted dialkylamines such as diethanolamine and the like; and arylalkylamines such as N-methylaniline, N-methyltoluidine, N-methylanisidine, and the like. The secondary cyclic amines are preferred when no $\Delta^1$ bond is present and when a $\Delta^1$-bond is present the dialkylamines are preferred. The $\Delta^4$ and $\Delta^{1,4}$-3-keto compounds of formula VI are converted to the corresponding 3-enol ethers of formula VII by known methods, e.g., by reaction with a trialkyl orthoformate such as trimethylorthoformate, triethylorthoformate, tripropylorthoformate and the like, in the presence of a catalyst such as paratoluenesulfonic acid, hydrochloric acid and the like, in accordance with known procedures, e.g., those described in Ber. 71, 1766.

The compounds of formula VII are then subjected to a Grignard reaction at the epoxy group to introduce in one operation, an alkyl group in the $16\beta$-position and a hydroxyl group in the $17\alpha$-position. In carrying out the reaction the selected compound of formula VII is reacted with an excess of an alkyl magnesium halide of the formula $R_5MgX$, where in $R_5$ is alkyl as hereinbefore defined and X is bromine, chlorine, or iodine, in accordance with the procedure disclosed in U. S. Pat. No. 3,104,246, to obtain the corresponding $16\beta$-alkyl-$17\alpha$-hydroxy compound of formula VIII.

The compounds of formula VIII, wherein X is alkoxy as hereinbefore defined, are then subjected to hydrolysis in accordance with methods known in the art to concommitantly remove the 20,21-acetonide group and the 3-alkoxy group to give the corresponding $\Delta^4$-3-keto-20,21-hydroxy compounds of formula X. The hydrolysis is carried out using an aqueous mineral acid, for example hydrochloric, sulfuric, perchloric, hydrobromic and the like, preferably in the presence of a water miscible organic solvent such as ethylene glycol, ethanol, methanol and other lower alkanols, tetrahydrofuran, dimethylformamide, dioxane, and the like, or the hydrolysis can be accomplished using an aqueous organic acid such as formic, acetic, propionic, oxalic, p-toluenesulfonic and the like.

The compounds of formula XIII, wherein X is the radical

as hereinbefore defined, are subjected to alkaline hydrolysis in accordance with known methods, for example using aqueous sodium hydroxide solution to obtain the corresponding compounds of formula IX. The 3-enamine compounds of formula XIII can be isolated from the Grignard reaction medium prior to hydrolysis or they can be hydrolized immediately following the Grignard reaction in a "one pot" operation. The compounds of formula IX are then isolated from the reaction medium by known methods an subjected to hydrolysis in the manner disclosed above to remove the 20,21-acetonide group, giving the corresponding compounds of formula X.

The compounds of formula X obtained by either of the above methods are then acylated at the 21-position in accordance with known methods, to obtain the corresponding compounds of formula XI, for example, with the appropriate acid anhydride or acid halide in the presence of a base such as pyridine. Suitable acylating agents are the acid halides and anhydrides of organic carboxylic acids, particularly hydrocarbon carboxylic acids of one to 18 carbon atoms, such as those hereinbefore listed. Those acids having more than four carbon atoms are more selective to the 21-position and are therefore preferred. The aromatic and cycloalkane carboxylic acids are especially advantageous.

The intermediates of formula XI are converted to the known, and pharmacologically active 9α-fluoro-16β-alkyl-prednisolones, such as Betamethasone, and the corresponding 21-acylates thereof, in accordance with methods known in the art, for example, as illustratively shown by the following sequence of formulas:

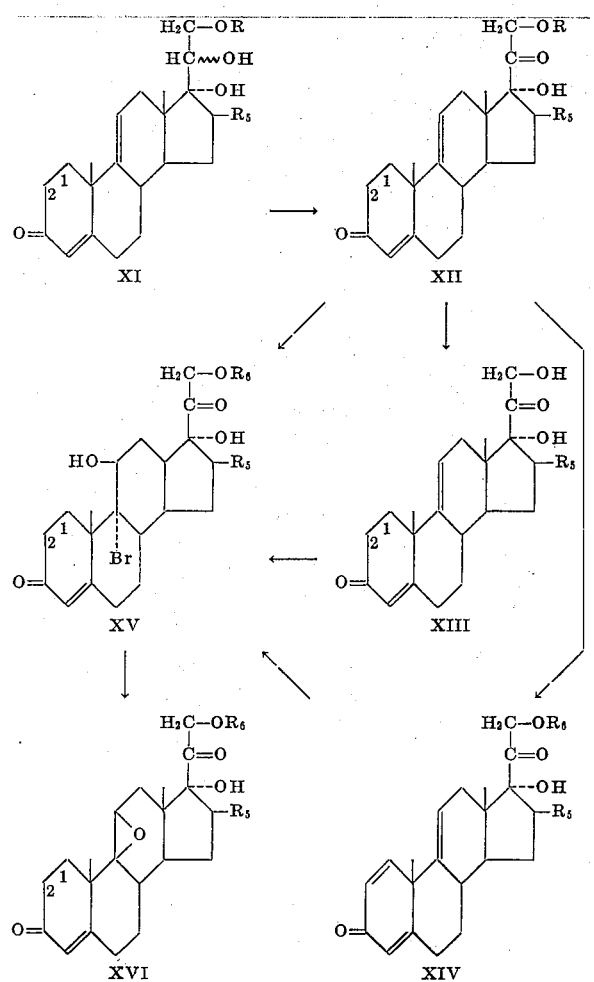

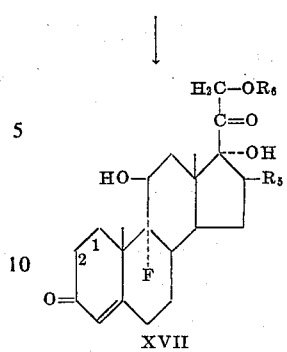

wherein R, $R_5$ and the 1,2-carbon atom linkage have the meanings given hereinabove, and $R_6$ is hydrogen or acyl as hereinbefore defined. The 20α- and 20β-hydroxy intermediates of formula XI are oxidized at the 20-position to obtain the corresponding 20-ketones of formula XII in accordance with methods known in the art, for example, the selected 20-hydroxy compound XI is oxidized with a liquid hydrocarbon sulfoxide and sulfur trioxide in the presence of a tertiary amine as disclosed in U. S. Pat. No. 3,444,216; or with a hydrocarbon sulfoxide and an N,N'-di(hydrocarbon substituted) carbodimide in the presence of an acid catalyst as disclosed in U. S. Pat. No. 3,248,380.

The compounds of formula XII and XIII, wherein the 1,2-carbon atom linkage is a single bond linkage are dehydrogenated at the 1,2-position by a fermentative or chemical dehydrogenation to give the corresponding compounds of formula XIV. Fermentative dehydrogenation comprises the use of microorganisms such as Septomyxa, Corynebacterium, Fusarium, and the like, under fermentation conditions well known in the art (e.g., U. S. Pat. Nos. 2,602,769; 2,902,410 and 2,902,411). Where Septomyxa is used to effect the dehydrogenation it is found to be advantageous to use with the substrate and medium a steroid promoter. The 21-free alcohols (XIII) are usually employed for the fermentative dehydrogenation process. However, the corresponding 21-acylates (XII) can be used, in these cases the 21-ester group is generally hydrolyzed during the fermentation process giving the corresponding free alcohol (XIV). However, when the 21-ester substituent is the acyl radical of a high molecular weight acid such as benzoyl, it is preferable to remove the ester group before subjecting the compound to fermentive dehydrogenation because the ester group may inhibit the fermentation reaction. The 21-ester groups of compound XII can be removed by methods known in the art for example with aqueous sodium hydroxide and the like to give the free alcohols (XIII). Chemical dehydrogenation can be carried out with selenium dioxide according to known procedures, see, for example, Meystre et al., Helv. Chim. Acta, 39, 734 (1956) or with 2,3-dichloro-5,6-dicyano-1,4-benzoquinone in a suitable organic solvent such as dioxane or benzene, see, for example, Djerassi, Steroid Reactions, Holden-Day Inc., San Francisco (1963) p. 232. Chemical dehydrogenation can be carried out using either the 21-acylates (XII) or the 21-free alcohols (XIII). The acylates are generally preferred as starting materials in the selenium dioxide dehydrogenation reaction giving the correspond $\Delta^{1,4}$-21-acylates of formula XIV. The compounds of formulas XII, XIII and XIV are converted to the 9α-fluoro compounds of formula XVII using the conventional procedure for the introduction of a 9α-fluoro substituent, namely, by reacting the selected compound 9(11)-compound with N-bromoacetamide and perchloric acid or the like to give the corresponding 9α-bromo compound (XV) followed by treatment with potassium acetate in acetone to form the corresponding 9β,11β-oxido compound (XVI) and reacting the latter compound with hydrogen fluoride under anhydrous or aqueous conditions to form the desired 9α-fluoro-11β-hydroxy compound (XVII).

The 21-free alcohols (XVII) are, if desired, reacylated at the 21-position in accordance with methods hereinbefore described, and 21-acylates (XVII) are, if desired, saponified by known methods to give the corresponding 21-free alcohols.

The order of reaction steps for converting the Δ⁴-compounds of formula XII to the Δ¹,⁴-compounds of XVII can be changed if desired, for example, the 1-dehydrogenation reaction can be carried out by subjecting a Δ⁴-compound (XVII) to either chemical or fermentive dehydrogenation as disclosed above, to give the corresponding Δ¹,⁴-compound of formula XVII.

The following examples describe the manner and process of making and using the invention and set forth the best mode contemplated by the inventors of carrying out the invention but are not to be construed as limiting.

EXAMPLE 1

11β,20α,21-trihydroxypregna-4,16dien-3-one (III)

A solution of 165.2 g. (0.5 mole) of 11β,21-dihydroxypregna-4-cis-17(20)-dien-3-one (I) and 0.6 g. of hematoporphyrin in 500 ml. of dimethylformamide is photo-oxygenated for 130 minutes using a fluorescent lamp while oxygen is bubbled through the solution to give 20α-hydroperoxy-11β,21-dihydroxypregna-4,16-dien-3-one (II). The mixture is then cooled to about −30° C. and 62.04 g. (0.5 mole) of trimethylphosphite is added. The cooling is discontinued and the reaction mixture is allowed to warm to about 20° to 25° C. until an exothermic reaction starts, cooling is then reapplied and the temperature is maintained below 20° C. When thin layer chromatography (hereinafter TLC) indicates that the reaction is complete the mixture is diluted with water and extracted with methylene chloride. The methylene chloride extracts are combined, dried and evaporated to a thick slurry. The slurry is filtered and the solids are dried under vacuum to give 34.0 g. of 11β,20α,21-trihydroxypregna-4,16-dien-3-one (III).

A second crop of 11β,20α,21-trihydroxypregna-4,16-dien-3-one (17.1 g.) containing a lesser amount of 11β,20β,21-trihydroxypregna-4,16-dien-3one (III) is obtained from the mother liquor.

Following the procedure of Example 1, above, but substituting 11β,21-dihydroxypregna-4trans-17(20)-dien-3-one (I) as starting material in place of the corresponding cis compound, there is obtained 11β,20β,21-trihydroxypregna-4,16-dien-3-one (III) as the predominant product. The corresponding 20α-isomer can be recovered from the mother liquors.

In the same manner, following the procedure of Example 1, above, 11β,21-dihydroxypregn-1,4-cis-17(20)-trien-3-one (I) and 11β,21-dihydroxypregna-1,4trans-17(20)-trien-3-one (I) are converted to 11β,20α,21-trihydroxypregna-1,4,16-trien-3-one (III) and 11β,20β,21-trihydroxypregna-1,4,16-triene-3-one (III), respectively.

EXAMPLE 2

11β,20α,21-trihydroxypregna-4,16-dien-3-one, 20α,21-acetonide (IV)

A solution of 23.0 g. (0.066 moles) of 11β,20α,21-trihydroxypregna-4,16-dien-3-one (III) and 2.0 g. of p-toluenesulfonic acid in 300 ml. of acetone is stirred for about 10 minutes. The solution is neutralized with about 43 ml. of saturated aqueous sodium bicarbonate solution and then concentrated under vacuum at about 50°–60 C. to a thick crystalline slurry. The slurry thus obtained is filtered and the collected solids washed with a small amount of water-acetone (60:40). The solids are then dried under vacuum to give 21.65 g. (0.056 mole) (84.3 yield) of 11β,20α,21-trihydroxypregna-4,16-dien-3-one, 20α,21-acetonide (IV), m.p. 171°–179° C.; [β]$_D$ +95° (CHCl$_3$).

Following the procedure of Example 2, above, but substituting 11β,20β,21-trihydroxypregna-4,16-dien-3-one (III) as starting material in place of the corresponding 20α-isomer, there is obtained 11β,20β,21-trihydroxypregna-4,16-dien-3-one, 20β,21-acetonide (IV).

In the same manner, following the procedure of Example 2, above, 11β,20α,21-trihydroxypregna-1,4,16-trien-3-one (III) and 11β,20β,21-trihydroxypregna-1,4,16-trien-3-one (III) are converted to 11β,20α,21-trihydroxypregna-1,4,16-trien-3-one 20α,21-acetonide (IV) and 11β,20β,21-trihydroxypregna-1,4,16-trien-3-one 20β,21-acetonide (IV), respectively.

EXAMPLE 3

11β,20α,21-trihydroxypregna-4,16-dien-3-one 20α,21-acetonide (IV)

A solution of 81 g. (0.225 mole) of 20α-hydroperoxy-11β,21-dihydroxypregna-4,16-dien-3-one (II) in dimethylformamide is cooled to about 0° C. and treated with 21-ml. of trimethyl phosphite while keeping the temperature below 20° C. The reaction mixture is then stirred for about 1 hour at room temperature, treated with 300 ml. of acetone and 12 g. of p-toluenesulfonic acid and stirring is continued for an additional 90 minutes at room temperature. The reaction mixture is then neutralized with about 15 ml. of triethylamine and 900 ml. of water is added slowly. The crystalline material thus obtained is cooled to about 20° C. filtered and the collected solids are washed well with cold water and dried to give 51.473 g. (0.1331 mole) (59.1 percent yield) of 11β,20α,21-trihydroxypregna-4,16-dien-3-one 20α,21-acetonide (IV), m.p. 150°–174° C.; [α]$_D$ +99° (CHCl$_3$).

Following the procedure of Example 3, above, but substituting as starting material 20β-hydroperoxy-11β,21-dihydroxypergna-4,16-dien-3-one (II) in place of the corresponding 20α-isomer, there is obtained 11β,20β,21-trihydroxypregna-4,16-dien-3-one 20β,21-acetonide (IV).

In the same manner, following the procedure of Example 3, above, 20α-hydroperoxy-11β,21-dihydroxypregna-1,4,16-triene-3-one (II) and 20β-hydroperoxy-11β,21-dihydroxypregna-1,4,16-tiene-3-one are converted to 11β,20α,21-trihydroxypregna-1,4,16-trien-3-one 21α,21-acetonide (IV) and 11β,20β,21-trihydroxypregna-1,4,16-trien-3-one 20β,21-acetonide (IV), respectively.

EXAMPLE 4

11β,20α,21-trihydroxy-16α,17α-oxidopregna-4-en-3-one 20α,21-acetonide (V)

A solution of 30.0 g. (0.07762 mole) of 11β,20α,21-trihydroxypregna-4,16-dien-3-one 20α,21-acetonide (IV) in about 125 ml. of methylene chloride is cooled to 0° C. with stirring and then a solution of 16.43 g. (0.0815 mole) of 85.6 percent m-chloroperbenzoic acid in 250 ml. of methylene chloride is added over a period of about 30 min. The reaction mixture is then kept at 0°–5° C. for about 22 hours or until a test of the reaction mixture with starch-iodine paper shows that no peracid is present. The reaction mixture is then filtered to remove crystallized m-chlorobenzoic acid (about 9.0 g.). The filtrate is then washed with 5 percent aqueous sodium bicarbonate solution, water and then dried over anhydrous magnesium sulfate. The filtrate is then evaporated to dryness to give 30.73 g. (0.0763 mole) (98.4 percent yield) of 11β,20α,21-trihydroxy-16α,17α-oxidopregna-4-en-3-one 20α,21-acetonide (V).

Following the procedure of Example 4, above, but substituting 11β,20β,21-trihydroxypregna-4,16-dien-3-one 20β,21-acetonide (IV) as starting material in place of the corresponding 20α-isomer, there is obtained 11β,20β,21-trihydroxy-16α,17α-oxidopregna-4-en-3-one 20β,21-acetonide (V).

In the same manner, following the procedure of Example 4, above, 11β,20α,21-trihydroxypregna-1,4,16-trien-3-one 20α,21-acetonide (IV) and 11β,20β21-trihydroxypregna-1,4,16-triene-3-one 20β,21-acetonide are converted to 11β,20α,21-trihydroxy-16α,17α-oxidopregna-1,4-dien-3-one 20α,21-acetonide (V) and 11β,20β,21-trihydroxy-16α,17α-oxidopregna-1,4-dien-3-one 20β,21-acetonide (V), respectively.

EXAMPLE 5

20α,21-dihydroxy-16α,17α-oxidopregna-4,9(11)-dien-3-one 20α,21-acetonide (VI)

To a solution of 14.1 g. (0.035 mole) of 11β,20α,21-trihydroxy-16α,17α-oxidopregna-4-en-3-one 20,21-acetonide (V) in 30 ml. of dimethylformamide and 30 ml. of pyridine at about −10° C. is added with stirring a solution of 2.9 g. (0.0455 mole) of sulfur dioxide in 5 ml. of pyridine. To the resulting solution is added dropwise a solution of 6.48 g. (0.036 mole; 2.09 ml.) of bromine in 15 ml. of pyridine. Water (165 ml.) is then added slowly. After the addition of the water the reaction mixture is stirred for 45 min. at 0°–5° C., filtered and washed well with water. The solids thus obtained are dried under vacuum at 60° C. to give 13.0 g. (0.0338 mole) (96.6 percent yield) of 20α,21-dihydroxy-16α,17α-oxidopregna-4,9(11)-dien-3-one 20α,21-acetonide (VI).

Following the procedure of Example 5, above, but substituting 11β,20β,21-trihydroxy-16α,17α-oxidopregna-4-en-3-one 20β,21-acetonide (v) as starting material in place of the corresponding 20α isomer, there is obtained 20β,21-dihydroxy-16α,17α-oxidopregna-4,9(11)-dien-3-one 20β,21-acetonide (VI).

In the same manner, following the procedure of Example 5, above, 11β,20α,21-trihydroxy-16α,17α-oxidopregna-1,4-dien-3-one 20α,21-acetonide (V) and 11β,20β,21-trihydroxy-16α,17α-oxidopregna-1,4-dien-3-one 20β,21-acetonide (V) are converted to 20α,21-dihydroxy-16α,17α-oxidopregna-1,4,9(11)-trien-3-one 21α,20-acetonide (VI) and 20β,21-dihydroxy-16α,17α-oxidopregna-1,4,9(11)-trien-3-one 21β,20-acetonide (VI), respectively.

EXAMPLE 6

20α,21-dihydroxy-16α,17α-oxido-3-(N-pyrrolidyl)-pregna-3,5,9(11)-triene 20α,21-acetonide (VII)

Methanol is added to 3.0 g. (0.00780 mole) of 20α,21-dihydroxy-16α,17α-oxidopregna-4,9(11)-dien-3-one 20α,21-acetonide to make a complete solution at reflux. To the refluxing methanol solution under nitrogen is added 0.57 g. (0.0080 mole) of pyrrolidine. The mixture is refluxed for five minutes and then left to cool to room temperature. The mixture is then cooled at about 0° C. for about 2 hrs. and filtered. The solids thus obtained are washed well with cold methanol and dried under vacuum to give 3.107 g. (0.00710 mole; 91 percent yield) of 20α,21-dihydroxy-17α-oxido-3-(N-pyrrolidyl)-pregna-3,5,9(11)-triene 20α,21-acetonide (VII).

Following the procedure of Example 6, above, but substituting 20β,21-dihydroxy-16α,17β-oxidopregna-4,9(11)-dien-3-one 20β,21-acetonide (VI) as starting material in place of the corresponding 20α-isomer, 20β,21-dihydroxy-16α,17α-oxido-3-(N-pyrrolidyl)-pregna-3,5,9(11)-triene 20β,21-acetonide (VII) is obtained.

In the same manner, following the procedure of Example 6, above, 20α,21-dihydroxy-16α,17α-oxidopregna-1,4,9(11)-trien-3-one 20α,21-acetonide and 20β,21-dihydroxy-16α,17α-oxidopregna-1,4,9(11)-trien-3-one 20β,21-acetonide (VI) are converted to 20α,21-dihydroxy-16α,17α-oxido-3-(N-pyrrolidyl)-pregna-1,3,5,9(11)-tetraene 20α,21-acetonide (VII) and 20β,21-dihydroxy-16α,17α-oxido-3-(N-pyrrolidyl)-pregna-1,3,5,9(11)-tetraene 20β,21-acetonide (VII), respectively.

EXAMPLE 7

16β-methyl-17α,20α,21-trihydroxypregna-4,9(11)-dien-3-one 20α,21-acetonide (VII)

To a slurry of 5.80 g. (0.01326 mole) of 20α,21-dihydroxy-16α,17α-oxido-3-(N-pyrrolidyl)-pregna-3,5,9(11)-triene-20α,21-acetonide (VII) in 110 ml. of tetrahydrofuran is added 125 ml. of 3M ethereal methyl magnesium bromide. The resulting slurry is heated with stirring under nitrogen and the solvent is distilled until the pot temperature reaches 90° C. The reaction mixture is then refluxed for about 3 hrs., cooled to about 60° C. and 60 ml. of tetrahydrofuran is added to the reaction mixture. This solution is poured into a 0° C. solution of 72 g. of ammonium chloride in 800 ml. of water. The resulting mixture is filtered and the solids are added to a mixture of 18 g. of sodium acetate, 18 ml. of water, 120 ml. of methanol and 1 ml. of 50 percent aq. NaOH solution. The resulting mixture is refluxed for about 3 hrs., concentrated to about one-third its original volume and diluted with water. The resulting mixture is extracted with methylene chloride. The methylene chloride extracts are combined, washed with water, dried and evaporated to dryness to give 5.1 g. (0.01275 mole; 96.1 percent yield) of 16β-methyl-17α,20α,21-trihydroxypregna-4,9(11)-dien-3-one 20α,21-acetonide (IX). The product thus obtained is dissolved in about 8 ml. of methanol, seeded, allowed to stand overnight at room temperature, cooled at about 0° C. for 2 hrs. and then filtered. The recrystallized product thus obtained is washed with a little cold methanol and dried under vacuum to give 1.6 g. (0.0040 mole; 30.2 percent yield) of 16β-methyl-17α,20α,21-trihydroxypregna-4,9(11)-dien-3-one 20α,21-acetonide (IX).

A second crop of 1.6 g. of 16β-methyl-17α,20α,21-trihydroxypregna-4,9(11)-dien-3-one 20α,21-acetonide (IX) is obtained from the mother liquors.

Following the procedure of Example 7, above, but substituting 20β,21-dihydroxy-16α,17α-oxido-3-(N-pyrrolidyl)-pregna-3,5,9(11)-triene 20β,21-acetonide (VII) as starting material in place of the corresponding 20α-isomer, 16β-methyl-17α,20β,21-trihydroxypregna-4,9(11)-dien-3-one 20β,21-acetonide (IX) is obtained.

In the same manner, following the procedure of Example 7, above, 20α,21-dihydroxy-16α,17α-oxido-3-(N-pyrrolidyl)-pregna-1,3,5,9(11)-tetraene 20α,21-acetonide (VII) and 20β,21-dihydroxy-16α,17α-oxido-3-(N-pyrrolidyl)-pregna-1,3,5,9(11)-tetraene 20β,21-acetonide (VII) are converted to 16β-methyl-17α,20α,21-trihydroxypregna-1,4,9(11)-trien-3-one 20α,21-acetonide (IX) and 16β-methyl-17α,20β,21-trihydroxypregna-1,4,9(11)-trien-3-one 20β,21-acetonide (IX), respectively.

EXAMPLE 8

16β-methyl-17α,20α,21-trihydroxypregna-4,9(11)-dien-3-one (X)

A mixture of 8.5 g. (0.0211 mole) of 16β-methyl-17α,20α,21-trihydroxypregna-4,9(11)-dien-3-one 20α,21-acetonide (IX) in about 150 ml. of methanol and 25 ml. of water is treated with 2.5 g. of pyridine hydrochloride and refluxed for about 90 minutes. The reaction mixture is then cooled to room temperature, diluted with about 50 ml. of water, seeded, evaporated under vacuum to a thick crystalline slurry, cooled to about 0° C. and filtered. The solids thus obtained are washed well with water and dried under vacuum at 60° C. to give 16β-methyl-17α,20α,21-trihydroxypregna-4,9(11)-dien-3-one (X), m.p. 173°–174.5° C.; [α]$_D$ +68° (CHCl$_3$).

Following the procedure of Example 8, above, but substituting 16β-methyl-17α,20β,21-trihydroxypregn-4,9(11)-dien-3-one 20β,21-acetonide (IX) as starting material in place of the corresponding 20α-isomer, 16β-methyl-17α,20β,21-trihydroxypregna-4,9(11)-dien-3-one (X) is obtained.

In the same manner, following the procedure of Example 8, above, 16β-methyl-17α,20α,21-trihydroxypregna-1,4,9(11)-trien-3-one 20α,21-acetonide (IX) and 16β-methyl-17α,20β,21-trihydroxypregna-1,4,9(11)-trien-3-one 20β,21-acetonide (IX) are converted to 16β-methyl-17α,20α,21-trihydroxypregna-1,4,9(11)-trien-3-one (X) and 16β-methyl-17α,20β,21-trihydroxypregna-1,4,9(11)-trien-3-one (X), respectively.

EXAMPLE 9

20α,21-dihydroxy-3-ethoxy-16α,17α-oxidopregna-3,5,9(11)-triene 20α,21-acetonide (VII)

To a stirred slurry of 12.0 g. (0.03121 mole) of 20α,21-dihydroxy-16α,17α-oxidopregna-4,9(11)-dien-3-one 20α,21-acetonide (VI) in about 40 ml. of ethanol at room temperature is added 12 ml. of triethylorthoformate and 0.8 g. of pyridine hydrochloride. The reaction mixture is then stirred at room temperature until the reaction is complete, about 2 hours. The reaction mixture is then treated with 0.5 ml. of pyridine and filtered. The solid product thus obtained is washed with a small amount of cold ethanol and dried under vacuum to give 10.8 g. (0.02618 mole, 84 percent yield) of 20α,21-dihydroxy-3-ethoxy-16α,17α3,5,9(11)-triene 20α,21-acetonide (VII).

Following the procedure of Example 9, above, but substituting 20β,21-dihydroxy-16α,17α-oxidopregna-4,9(11)-dien-3-one 20β,21-acetonide (VI) as starting material in place of the 20α-isomer, gives 20β,21-dihydroxy-3-ethoxy-16α,17α-oxidopregna-3,5,9(11)-triene 20β,21-acetonide (VII).

In the same manner, following the procedure of Example 9, above, 20α,21-dihydroxy-16α,17α-oxidopregna-1,4,9(11)-triene-3-one 20α,21-acetonide (XI) and 20β,21-dihydroxy-16α,17α-oxidopregna-1,4,9(11)-trien-3-one 20β,21-acetonide (VI) to give 20α,21-dihydroxy-3-ethoxy-16α,17α-oxidopregna-1,3,5,9(11)-tetraene 20α,21-acetonide (VII) and 20β,21-dihydroxy-3-ethoxy-16α,17α-oxidopregna-1,3,5,9,(11-tetraene 20β,21-acetonide (VII), respectively.

EXAMPLE 10

16β-methyl-17α,20α,21-trihydroxy-3-ethoxypregna-3,5,9(11)-triene 20α,21-acetonide (VIII)

A solution of 10.0 g. (0.02424 mole) of 20α,21-dihydroxy-3-ethoxy-16α,17α-oxidopregna-3,5,9(11)-triene 20α,21-acetonide in 165 ml. of tetrahydrofuran is added at room temperature with stirring to 162 ml. of 3M methyl magnesium bromide in ethyl ether. The resulting solution is heated with stirring under nitrogen and the solvent is distilled until the pot temperature reaches about 88° C. The reaction mixture is then refluxed for about 140 min. or until the reaction is complete. The reaction mixture is then cooled to about 60° C. and 100 ml. of tetrahydrofuran is added with stirring. The resulting solution is poured slowly into a 0° C. solution of 97 g. of ammonium chloride in 1,500 ml. of water. The slurry thus obtained is stirred for 40 min, and then filtered. The solids thus obtained are washed with water and then dried under vacuum at 60° C. to give 10.41 g. of product, which is titurated with 15 ml. of ethanol and 10 ml. of methanol, cooled to 0° C. and filtered. The solids thus obtained are washed with a little cold methanol and dried under vacuum at 60° C. to give 9.0 g. (0.0210 mole; 86.6 percent yield) of 16β-methyl-17α,20α,21-trihydroxy-3-ethoxypregna-3,5,9(11)-triene 20α,21-acetonide (VII), m.p. 176.5°–185.5° C.; [α]$_D$ −158° (CHCl$_3$ + pyridine).

Following the procedure of Example 10, above, but substituting 20β,21-dihydroxy-3-ethoxy-16α,17α-oxidopregna-3,4,9(11)-triene-20β,21-acetonide (VII) as starting material in place of the corresponding 20α-isomer, 16β-methyl-17α,20β,21-trihydroxy-3-ethoxy-pregna-3,5,9(11)-triene 20β,21-acetonide (VIII) is obtained.

In the same manner, following the procedure of Example 10, above, 20α,21-dihydroxy-3-ethoxy-16α,17α-oxidopregna-1,3,5,9(11)-tetraene 20α,21-acetonide (VII) and 20β,21-dihydroxy-3-ethoxy-16α,17α-oxidopregna-1,3,5,9(11)-tetraene 20β,21-acetonide (VII) are converted to 16β-methyl-17α,20α,21-trihydroxy-3-ethoxy-pregna-1,3,5,9(11)-tetraene 20α,21-acetonide (VIII) and 16β-methyl-17α,20β,21-trihydroxypregna-1,3,5,9(11)-tetraene 20β,21-acetonide (VIII), respectively.

EXAMPLE 11

16β-methyl-17α,20α,21-trihydroxypregna-4,9(11)-diene-3-one (X)

A mixture of 8.5 g. (0.0200 mole) of 16β-methyl-17α,20,21-trihydroxy-3-ethoxy-pregna-3,5,9(11)-triene 20α,21-acetonide (VIII), 130 ml. of methanol, 30 ml. of chloroform, 20 ml. of water and 2.5 g. of p-toluenesulfonic acid is refluxed for about 90 minutes, cooled to room temperature, diluted with 25 ml. of water, seeded and evaporated to a thick crystalline slurry under vacuum in a 50°–60° C. water bath. The mixture is then cooled to 0° C. and filtered. The solids thus obtained are washed well with water and dried under vacuum at 60° C. to give 6.71 g. (0.01861 mole; 93 percent yield) of 16β-methyl-17α,20α,21-trihydroxypregna-4,9(11)-diene-3-one (X), m.p. 171.5°–176° C., $[\alpha]_D$ +66° (CHCl$_3$).

Following the procedure of Example 11, above, but substituting 17α,20β,21-trihydroxy-3-ethoxypregna-3,5,9(11)-triene 20β,21-acetonide (VIII) as starting material in place of the corresponding 20α-isomer, 16β-methyl-17α,20β,21-trihydroxypregna-4,9(11)-diene-3-one (X) is obtained.

In the same manner, following the procedure of Example 11, above, 17α,20α,21-trihydroxy-3-ethoxypregna-1,3,5,9(11)-tetraene-20α,21-acetonide (VIII) and 17α,20β,21-trihydroxy-3-ethoxypregna-1,3,5,9(11)-tetraene 20β,21-acetonide (VIII) are converted to 16β-methyl-17α,20α,21-trihydroxypregna-1,4,9(11)-trien-3-one (X) and 16β-methyl-17α,20β,21-trihydroxypregna-1,4,9(11)-triene-3-one (X), respectively.

EXAMPLE 12

16β-methyl-17α,20α,21-trihydroxypregna-4,9(11)-diene-3-one 21-benzoate (XI)

A solution of 6.31 g. (0.0175 mole) of 16β-methyl-17α,20,21-trihydroxypregna-4,9(11)-dien-3-one (X) in 100 ml. of dioxane and 12 ml. of pyridine is stirred at room temperature under nitrogen. To this solution is added 2.46 g. (0.0175 mole) of benzoyl chloride. After stirring the solution for about 10 minutes, an additional 2.46 g. of benzoyl chloride is added and stirring is continued until the reaction is complete, about 15 min. Water (100 ml.) is then added dropwise to the reaction mixture. The resulting slurry is cooled to about 0° C., filtered and the solids are washed well with water. The solids thus obtained are titurated with 30 ml. of diethyl ether, filtered and dried under vacuum to give 7.365 g. (0.01585 mole) (90.5 percent yield) of 16β-methyl-17α,20α,21-trihydroxypregna-4,9,(11)-dien-3-one 21-benzoate (XI), m.p. 172.5°–181° C., $[\alpha]_D$ +58° (CHCl$_3$).

Following the procedure of Example 12, above, but substituting 16β-methyl-17α,20β,21-trihydroxypregna-4,9(11)-dien-3-one (X) as starting material in place of the corresponding 20α-isomer, 16β-methyl-17α,20β,21-trihydroxypregna-4,9(11)-dien-3-one 21-benzoate (XI) is obtained.

In the same manner, following the procedure of Example 12, above, 16β-methyl-17α,20α,21-trihydroxypregna-1,4,9(11)-trien-3-one (X) and 16β-methyl-17α,20β,21-trihydroxypregna-1,4,9(11)-trien-3-one (X) are converted to 16β-methyl-17α,20α,21-trihydroxypregna-1,4,9(11)-trien-3-one 21-benzoate (XI) and 16β-methyl-17α,20β,21-trihydroxypregna-1,4,9(11)-trien-3-one 21-benzoate (XI), respectively.

EXAMPLE 13

16β-methyl-17α,21-dihydroxypregna-4,9(11)-diene-3,20-dione 21-benzoate (XII)

A solution of 13 g. of pyridine sulfur trioxide complex in 50 ml. of dimethylsulfoxide is added dropwise over a period of about 6 min. to a vigorously stirred mixture of 7.0 g. (0.01507 mole) of 16β-methyl-17α,20α,21-trihydroxy-4,9(11)-pregnadien-3-one 21-benzoate (XI) in 37 ml. of dimethylsulfoxide and 34 ml. of triethylamine, while keeping the temperature at about 20° C. The resulting mixture is then stirred at room temperature for about 1 hr. The pH of the mixture is adjusted to 4.5 by the addition of 18 percent aq. HCl. The mixture is then diluted with water and filtered. The solids thus obtained are washed with water and dried under vacuum to give 6.95 g. of partially oxidized product. The product (6.95 g.) thus obtained is oxidized again using the same procedure as above to give 6.9 g. of material, which is triturated with 30 ml. of methanol to give 5.70 g. (0.01232 mole) (81.7 percent yield) of oxidized product. The product thus obtained is crystallized from methanol to give 4.7 g. of 16β-methyl-17α,21-dihydroxypregna-4,9(11)-dien-3,20-dione 21-benzoate (XII), m.p. 198.5°–203.5° C.; $[\alpha]_D$ +167° (CHCl$_3$).

Following the procedure of Example 13, above, but substituting 16β-methyl-17α,20β,21-trihydroxypregna-4,9(11)-diene-3-one 21-benzoate (XI) as starting material in place of the corresponding 20α-isomer, 16β-methyl-17α,21-dihydroxypregna-4,9(11)-dien-3,20-dione 21-benzoate (XII) is obtained.

In the same manner, following the procedure of Example 13, above, 16β-methyl-17α,20α,21-trihydroxypregna-1,4,9(11)-triene-3-one 21-benzoate (XI) and 16β-methyl-17α,20β,21-trihydroxypregna-1,4,9(11)-triene-3-one 21-benzoate (XI) are converted to 16β-methyl-17α,21-dihydroxypregna-1,4,9(11)-trien-3,20-dione 21-benzoate (XII) and 16β-methyl-17α,21-dihydroxypregna-1,4,9(11)-trien-3,20-dione 21-benzoate (XII), respectively.

EXAMPLE 14

16β-methyl-17α,21-dihydroxypregna-1,4,9(11)-triene- 3,20-dione 21-benzoate (XIV)

A mixture of 5.0 g. of 16β-methyl-17α,21-dihydroxypregna-4,9(11)-diene-3,20-dione 21-benzoate (XII), 3.0 g. of selenium dioxide, 250 ml. of tert.-butylalcohol and 1 ml. of pyridine is refluxed for 24 hours. An additional 0.5 g. of selenium dioxide is then added to the reaction mixture and refluxing is continued for about 3 more hours. The reaction mixture is then filtered with the aid of celite and the filter pad is washed with ethyl acetate. The filtrate thus obtained is concentrated to dryness under vacuum and the residue is chromatographed over silica gel to give 3.0 g. of 16β-methyl-17 α,21-dihydroxypregna-1,4,9(11)-triene-3,20-dione 21-benzoate (XIV).

In the same manner, following the procedure of Example 14, the other 16β-alkyl-17α,21-dihydroxypregna-4,9(11)-diene-3,20-diones 21-acylates (XII) and 21-free alcohols of formula XIII are likewise converted to the corresponding 16β-alkyl-17α,21-dihydroxypregna-1,4,9(11)-triene-3,20-dione 21-acylates and 21-free alcohols, respectively of formula (XIV).

EXAMPLE 15

9α-bromo-16β-methyl-11β,17α,21-trihydroxypregna-1,4-diene-3,20-dione 21-benzoate (XV)

A solution of 10.4 g. of 16β-methyl-17α,21-dihydroxypregna-1,4,9(11)-triene-3,20-dione 21-benzoate (XIV) in 90 ml. of tetrahydrofuran is cooled to about 15° C. and treated with 48 ml. of 0.47N aqueous perchloric acid followed by 4.1 g. of N-bromoacetmaide. After stirring 4 hours in the dark at 25°–30° C. enough saturated aqueous sodium sulfite solution is added to the reaction mixture to discharge the excess hypybromous acid. The mixture is poured slowly into ice water. The resulting precipitate is collected by filtration, washed neutral with water and dried to give 11.6 g. of 9α-bromo-16β-methyl-11β,17α,21-trihydroxypregna-1,4-diene-3,20-dione 21-benzoate (XV).

In the same manner, following the procedure of Example 15, other compounds of formula XIV and the compounds of formulas XII and XIII can likewise be converted to the corresponding 9α-bromo compounds of formula (XV).

EXAMPLE 16

17α,21-dihydroxy-16β-methyl-9β,11β-oxidopregna-1,4-dien-3,20-dione (XVI)

A stirred solution of 23.9 g. of 9α-bromo-16β-methyl-11β,17α,21-trihydroxypregna-1,4-diene-3,20-dione 21-benzoate (XV) in 1,060 ml. of a methanol-chloroform mixture (3:2) is treated in a nitrogen atmosphere at 0°–5° C. with 88 ml. of 1N sodium hydroxide solution added dropwise over 50 minutes. Stirring is continued for about 3 hours and the mixture is neutralized by the addition of acetic acid. The solution is concentrated under reduced pressure to a thick crystalline slurry which is poured into 1,060 ml. of ice water. The resulting precipitate is filtered, washed neutral with water and dried under vacuum to give 14.3 g. of 17α,21-dihydroxy-16β-methyl-9β,11β-oxidopregna-1,4-diene-3,20-dione (XVI) m.p. 231°–239° C.

In the same manner, following the procedure of Example 16, the other 9α-bromo compounds of formula XV are likewise converted to the corresponding 9β,11β oxido compounds of formula XVI.

EXAMPLE 17

9α-fluoro-11β,17α,21-trihydroxy-16β-methylpregna-1,4-diene-3,20-dione (XVII)

To 53 ml. of 70 percent aqueous hydrogen fluoride chilled to about −30° C. is added with stirring a total of 21.1 g. of 17α,21-dihydroxy-16β-methyl-9β,11β-oxidopregna-1,4-diene-3,20-dione (XVI) in small amounts while maintaining the temperature below −20° C. The reaction mixture is stirred for about 5 hours and then poured slowly into a solution of 184 g. of potassium carbonate in 210 ml. of water. The resulting precipitate is filtered, washed to neutrality with water and dried to give 22.2 g. of crude product. Crystallization from ethyl acetate gives 17.6 g. of 9α-fluoro-11β,17α,21-trihydroxy-16β-methylpregna-1,4-diene-3,20-dione m.p. 241°–243° C. (XVII).

In the same manner, following the procedure of Example 17, the other 9β,11β-oxido compounds of formula XVI are likewise converted to the corresponding 9α-fluoro compounds of formula XVII.

EXAMPLE 18

20α,21-dihydroxy, 16α,17α-oxido-3-diethylaminopregna-1,3,5,9(11)-tetraene 20α,21-acetonide (VII)

To a solution of 6 ml. diethylamine in 15 ml. of dry benzene at 15° is slowly added 0.5 ml. of titanium tetrachloride in 10 ml. of benzene. After stirring 30 minutes, this titanium chloride-amine complex is then added over 30 minutes to a solution of 1.8 g. of 20α,21-dihydroxy-16α,17α-oxido-1,4,9(11)-trien-3-one 20α,21-acetonide (VI) in 10 ml. of dry methylene chloride at room temperature. After the addition, this heterogeneous mixture is stirred at 5° for 3 hours after which 0.2 ml. of water in 1 ml. diethylamine is added with vigorous stirring. The resulting precipitate is filtered over sodium sulfate, washed with benzene and the filtrate is evaporated to dryness under vacuum. The residue thus obtained is triturated with cold methanol to give 20α,21-dihydroxy-16α,17α-oxido-3-diethylaminopregna-1,3,5,9(11)-tetraene 20α,21-acetonide (VII).

Following the precedure of EXample 18, above, but substituting 20β,21-dihydroxy-16α,17α-oxido-1,4,9 (11)-trien-3-one 20β,21-acetonide (VI) as starting material in place of the corresponding 20α-isomer, 20β,21-dihydroxy-16α,17α-oxido-3-diethylaminopregna-1,3,5,9(11)-tetraene 20β,21-acetonide (VII) is obtained.

The 20α,21-dihydroxy-16α,17α-oxido-3-diethylaminopregna-1,3,5,9(11)-tetraene 20α,21-acetonide (VII) and 20β,21-dihydroxy-16α,17α-oxido-3-diethylaminopregna-1,3,5,9(11)-tetraene 20β,21-acetonide (VII) are converted to 16β-methyl-17α,20α,21-trihydroxypregna-1,4,9(11)-trien-3-one 20α,21-acetonide (VIII) and 16β-methyl-17α,20β,21-trihydroxypregna-1,4,9(11)-trien-3-one 20β,21-acetonide, respectively, in accordance with the procedure of Example 7, above.

We claim:

1. A compound of the formula:

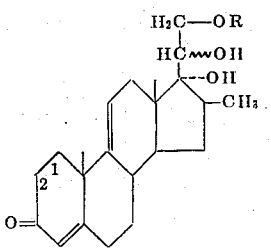

wherein R is hydrogen or the acyl radical of a hydrocarbon carboxylic acid of one to 18 carbon atoms, inclusive, and the 1,2-carbon atom linkage is a single bond linkage or a double bond linkage.

2. 16β-methyl-17α,20α,21-trihydroxypregna-4,9(11)-dien13-one, the compound of claim 1, wherein R is hydrogen and the 1,2-carbon atom linkage is a single bond linkage.

3. 16β-methyl-17α,20α,21-trihydroxypregna-4,9(11)-dien-3-one 21-benzoate, the compound of claim 1, wherein R is benzoyl and the 1,2-carbon atom linkage is a single bond linkage.

4. A compound of the formula:

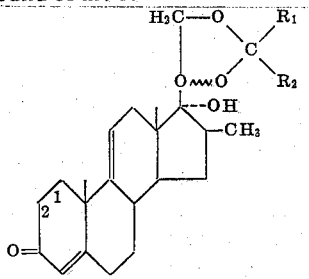

wherein $R_1$ and $R_2$ taken separately are each selected from the group consisting of hydrogen, an alkyl radical of one to eight carbon atoms, inclusive, an aralkyl radical of seven to 13 carbon atoms, inclusive and an aryl radical of six to 12 carbon atoms, inclusive; $R_1$ and $R_2$ taken together with the attached carbon represent a cycloalkyl radical of three to eight carbon atoms, inclusive; and the 1,2-carbon atom linkage is a single bond linkage or a double bond linkage.

5. 16β-methyl-17α,20α,21-trihydroxypregna-4,9(11)-dien-3-one 20α,21-acetonide, the compound of claim 4, wherein $R_1$ and $R_2$ are each methyl and the 1,2-carbon atom linkage is a single bond linkage.

6. A compound of the formula:

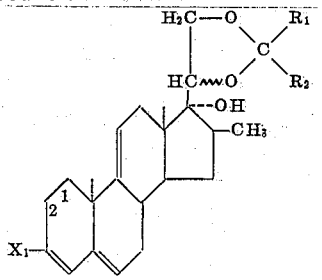

wherein $R_1$ and $R_2$ taken separately are each selected from the group consisting of hydrogen, an alkyl radical of 1 to 8 carbon atoms, inclusive, an aralkyl radical of 7 to 12 carbon atoms, inclusive, and an aryl radical of 6 to 12 carbon atoms, inclusive; $R_1$ and $R_2$ taken together with the attached carbon atom represent a cycloalkyl radical of 3 to 6 carbon atoms, inclusive; $X_1$ is an alkoxy radical of 1 to 12 carbon atoms, inclusive; and the 1,2-carbon atom linkage is a single bond linkage or a double bond linkage.

7. 16β-methyl-17α,20α,21-trihydroxy-3-ethoxypregna-3,5,9(11)-triene 20α,21-acetonide, the compound of claim 6, wherein $R_1$ and $R_2$ are each methyl, $X_1$ is ethoxy and the 1,2-carbon atom linkage is a single bond linkage.

8. A compound of the formula:

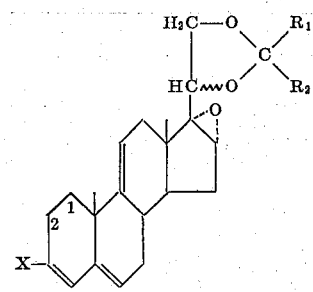

wherein $R_1$ and $R_2$ taken separately are selected from the group consisting of hydrogen, an alkyl radical of one to eight carbon atoms, inclusive, an aralkyl radical of seven to 13 carbon atoms, inclusive, and an aryl radical of six to 12 carbon atoms, inclusive; $R_1$ and $R_2$ taken together with the attached carbon atom represent a cycloalkyl radical of three to six carbon atoms, inclusive; X is selected from the group consisting of an alkoxy radical of one to 12 carbon atoms, inclusive, and the radical,

in which $R_3$ and $R_4$ taken separately are each alkyl as hereinbefore defined and $R_3$ and $R_4$ taken together with

constitute a saturated heterocyclic amino radical,

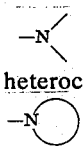

of from five to nine ring atoms, inclusive; and the 1,2-carbon atom linkage is a single bond linkage or a double bond linkage.

9. 20α,21-dihydroxy-3-ethoxy-16α,17α-oxidopregna-3,5,9(11)-triene 20α,21-acetonide, the compound of claim 8, wherein $R_1$ and $R_2$ are each methyl, X is ethoxy and the 1,2-carbon atom linkage is a single bond linkage.

10. 20α,21-dihydroxy-16α,17α-oxido-3-(N-pyrrolidyl)-pregna-3,5,9(11)-triene 20α,21-acetonide, the compound of claim 8 wherein $R_1$ and $R_2$ are each methyl, X is N-pyrrolidyl and the 1,2-carbon atom linkage is a single bond linkage.

11. A compound of the formula:

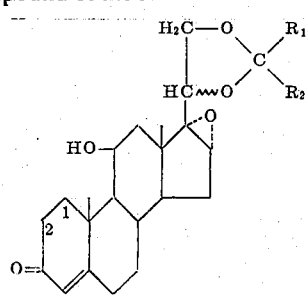

wherein $R_1$ and $R_2$ taken separately are each selected from the group consisting of hydrogen, an alkyl radical of one to eight carbon atoms, inclusive, an aralkyl radical of seven to 13 carbon atoms, inclusive, and an aryl radical of six to 12 carbon atoms, inclusive; $R_1$ and $R_2$ taken together represent a cycloalkyl radical of six to 12 carbon atoms, inclusive; and the 1,2-carbon atom linkage is a single bond linkage or a double bond linkage.

12. $11\beta,20\alpha,21$-trihydroxy-$16\alpha,17\alpha$-oxidopregna-4-en-3-one $20\alpha,21$-acetonide, the compound of claim 11, wherein $R_1$ and $R_2$ are each methyl and the 1,2-carbon atom linkage is a single bond linkage.

13. A compound of the formula:

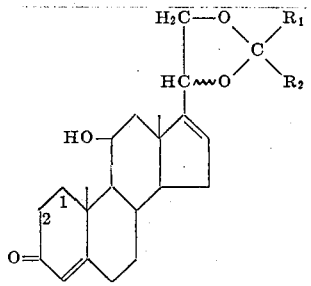

wherein $R_1$ and $R_2$ taken separately are each selected from the group consisting of hydrogen, an alkyl radical of one to eight carbon atoms, inclusive, an aralkyl radical of seven to 13 carbon atoms, inclusive, and an aryl radical of six to 12 carbon atoms, inclusive; $R_1$ and $R_2$ taken together represent a cycloalkyl radical of six to 12 carbon atoms, inclusive; and the 1,2-carbon atom linkage is a single bond linkage or a double bond linkage.

14. $11\beta,20\alpha,21$-trihydroxypregna-4,16-dien-3-one $20\alpha,21$-acetonide, the compound of claim 13, wherein $R_1$ and $R_2$ are each methyl and the 1,3-carbon atom linkage is a single bond linkage.

15. The process of the production of a compound of the formula:

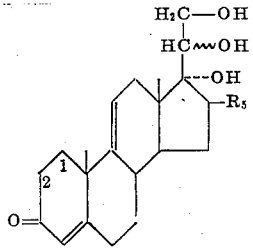

wherein $R_5$ is an alkyl radical of one to eight carbon atoms, inclusive, and the 1,2-carbon atom linkage is a single bond linkage or a double bond linkage, which comprises:

1. epoxidizing a 20,21-acetonide of the formula:

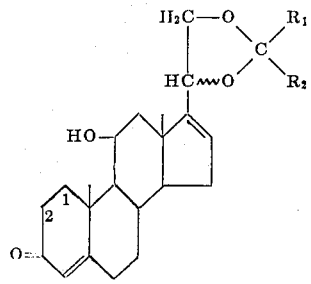

wherein $R_1$ and $R_2$ taken separately are each selected from the group consisting of hydrogen, an alkyl radical of one to eight carbon atoms, inclusive, an aralkyl radical of seven to 13 carbon atoms, inclusive, and an aryl radical of six to 12 carbon atoms, inclusive; $R_1$ and $R_2$ taken together represent a cycloalkyl radical of six to 12 carbon atoms inclusive; and the 1,2-carbon atom linkage is a single bond linkage or a double bond linkage, with a peracid to obtain the corresponding $16\alpha,17\alpha$-oxido compound.

2. dehydrating the $16\alpha,17\alpha$-oxido compound so obtained with a dehydrating agent to obtain the corresponding $16\alpha,17\alpha$-oxido-9(11)-dehydro compound;

3. reacting the $16\alpha,17\alpha$-oxido-9(11)-dehydro compound so obtained with a secondary amine of the formula

in which $R_3$ and $R_4$ taken separately are each alkyl and $R_3$ and $R_4$ taken together with

constitute a saturated heterocyclic amine, to obtain the corresponding 3-enamine thereof;

4. reacting the 3-enamine so obtained with an alkyl magnesium halide of the formula, $R_5MgX$ in which $R_5$ is an alkyl radical as defined above and X is chlorine, bromine or iodine, to obtain the corresponding $16\beta$-alkyl-3-enamine;

5. subjecting the $16\beta$-alkyl-3-enamine to alkaline hydrolysis to regenerate the $\Delta^4$-3-keto ring system and;

6. subjecting the $\Delta^4$-3-keto $16\beta$-alkyl-20,21-acetonide compound so obtained to acid hydrolysis with an aqueous mineral acid to remove the 20, 21-acetonide group.

16. The process of claim 15 for the production of $16\beta$-methyl-$17\alpha,20\alpha,21$-trihydroxypregna-4,9(11)-dien-3-one, wherein the starting material is $20\alpha,21$-dihydroxypregna-4,16-dien-3-one $20\alpha,21$-acetonide and the alkyl magnesium halide is methyl magnesium bromide.

17. The process for the production of a compound of the formula:

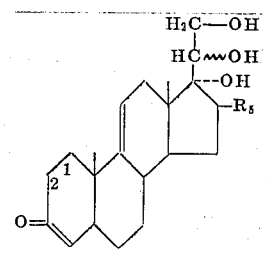

wherein $R_5$ is an alkyl radical of one to eight carbon atoms, inclusive, and the 1,2-carbon atom linkage is a single bond linkage or a double bond linkage, which comprises:

1. epoxidizing a 20,21-acetonide of the formula:

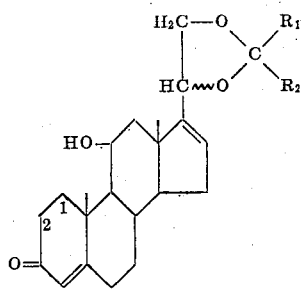

wherein $R_1$ and $R_2$ taken separately are each selected from the group consisting of hydrogen, an alkyl radical of one to eight carbon atoms, inclusive, an aralkyl radical of seven to 13 carbon atoms, inclusive, and an aryl radical of six to 12 carbon atoms, inclusive; $R_1$ and $R_2$ taken together represent a cycloalkyl radical of six to 12 carbon atoms, inclusive; and the 1,2-carbon atom linkage is a single bond linkage or a double bond linkage, with a peracid to obtain the corresponding 16α,17α-oxido compound 2. dehydrating the 16α,17α-oxido compound so obtained with a dehydrating agent to obtain the corresponding 16α,17α-oxido-9(11)-dehydro compound;

3. reacting the 16α,17α-oxido-9(11)-dehydro compound so obtained with a trialkyl orthoformate to obtain the corresponding 3-enol ether;

4. reacting 3-enol ether so obtained with an alkyl magnesium halide of the formula, $R_5MgX$ in which $R_5$ is an alkyl radical as defined above and X is chlorine, bromine or iodine, to obtain the corresponding 16β-alkyl-3-enol ether; and 5. subjecting the 16β-alkyl-3-enol ether so obtained to acid hydrolysis with an aqueous mineral acid to concommitantly regenerate the Δ⁴-3-keto ring system and remove the 20,21-acetonide group.

18. The process of claim 17 for the production of 16β-methyl-17α,20α,21-trihydroxypregna-4,9(11)-dien-3-one, wherein the starting material is 20α,21-dihydroxypregna-4,16-dien-3-one 20α,21-acetonide and the alkyl magnesium halide is methyl magnesium bromide.

* * * * *